Figure 1:

No. 866,379.    PATENTED SEPT. 17, 1907.
E. N. MONROE.
ADVERTISING DEVICE.
APPLICATION FILED APR. 9, 1907.

WITNESSES

INVENTOR
Edward N. Monroe
BY
ATTORNEYS

UNITED STATES PATENT OFFICE.

EDWARD NELSON MONROE, OF UNIONVILLE, MISSOURI.

ADVERTISING DEVICE.

No. 866,379.  Specification of Letters Patent.  Patented Sept. 17, 1907.

Application filed April 9, 1907. Serial No. 367,204.

*To all whom it may concern:*

Be it known that I, EDWARD NELSON MONROE, a citizen of the United States, and a resident of Unionville, in the county of Putnam and State of Missouri, have invented a new and Improved Advertising Device, of which the following is a full, clear, and exact description.

The object of the invention is to provide a new and improved advertising device in the form of a pin or shield, arranged for use as a pin, to fasten parts together, and at the same time display an advertisement of the desired character.

The invention consists of novel features and parts and combinations of the same, which will be more fully described hereinafter and then pointed out in the claim.

A practical embodiment of the invention is represented in the accompanying drawings forming a part of this specification, in which similar characters of reference indicate corresponding parts in the drawings.

Figure 2:
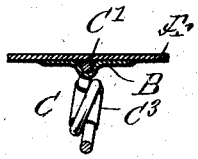
Figure 3:
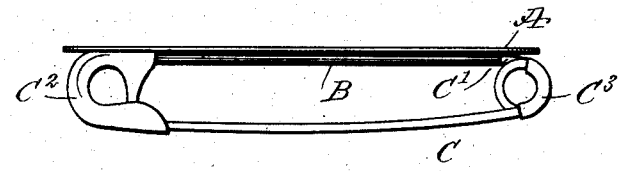

Figure 1 is a perspective view of the improvement, Fig. 2 is an enlarged transverse section of the same, and Fig. 3 is a side elevation of the same.

A shield or plate A, preferably of an oblong shape, is provided on its upper face with an advertisement of any desired character, and on the under side of the shield or plate A is secured or formed a longitudinally extending bearing B, for engagement by the fixed shank $C'$ of a pin C, preferably of the safety type, as indicated in the drawings. The ends of the bearing B terminate a distance from the corresponding ends of the shield or plate A, and the said bearing ends abut against the head $C^2$ and the coil $C^3$ of the safety pin, to hold the shield or plate A against longitudinal movement on the safety pin, but to allow a limited turning movement in a transverse direction to either side of the safety pin. Now when the safety pin is used for its legitimate purpose, such as to fasten two parts together, then the shield or plate A practically covers or hides the safety pin C and at the same time the shield or plate is free to turn on the safety pin, to readily adjust itself to the cloth or other material of the parts fastened together by the safety pin and irrespective of the position of the safety pin on the fastened parts. It will thus be seen that by the arrangement described the upper face carrying the advertisement is freely displayed, no matter in what position the safety pin may be.

The device is very simple and durable in construction and can be cheaply manufactured.

Having thus described my invention, I claim as new and desire to secure by Letters Patent:

An advertising device comprising a safety pin consisting of a shank, and a pin connected by a coil spring, the free end of the shank being provided with a head, and a shield provided on one side with an elongated bearing for receiving the shank, the ends of the bearing abutting against the head and the spring coil to prevent endwise movement of the shield on the shank, and to permit limited turning of the shield relative to the shank.

In testimony whereof I have signed my name to this specification in the presence of two subscribing witnesses.

EDWARD NELSON MONROE.

Witnesses:
　MARIE CASON,
　CHAS. BURGESS.